Figure 1:
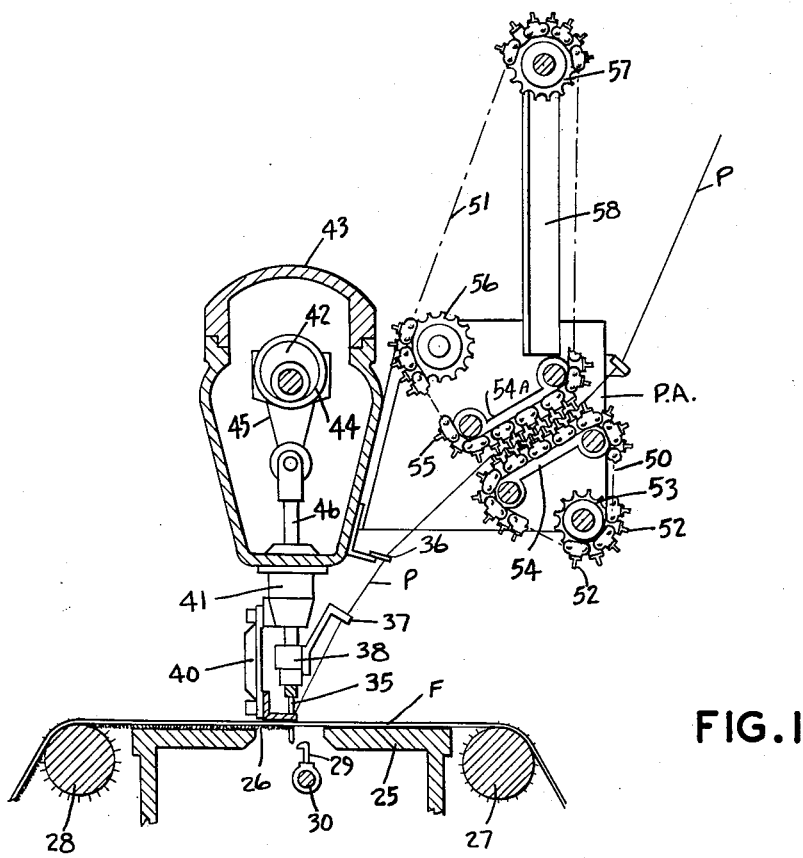

Jan. 28, 1964  H. F. NOWICKI  3,119,361
YARN FEED APPARATUS WITH DETACHABLE TEMPLATE
Filed April 24, 1961  5 Sheets-Sheet 1

INVENTOR.
HENRY F. NOWICKI
BY

Jan. 28, 1964    H. F. NOWICKI    3,119,361
YARN FEED APPARATUS WITH DETACHABLE TEMPLATE
Filed April 24, 1961    5 Sheets-Sheet 3

INVENTOR.
HENRY F. NOWICKI
BY

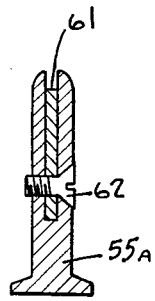
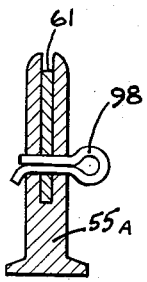
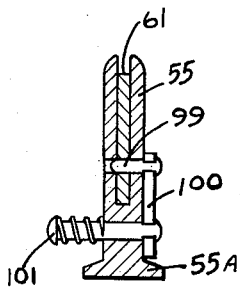
FIG.12  FIG.13  FIG.14
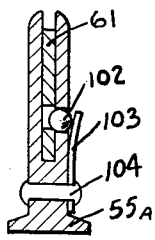
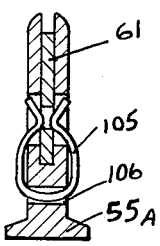
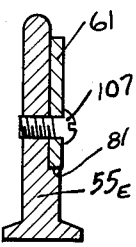
FIG.15  FIG.16  FIG.17
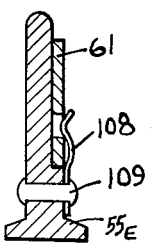
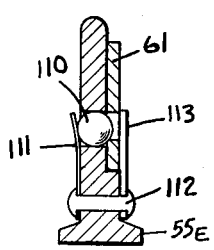
FIG.18  FIG.19

Jan. 28, 1964   H. F. NOWICKI   3,119,361
YARN FEED APPARATUS WITH DETACHABLE TEMPLATE
Filed April 24, 1961   5 Sheets-Sheet 5

INVENTOR.
HENRY F. NOWICKI
BY
*Helen W. Ballard*

United States Patent Office 3,119,361
Patented Jan. 28, 1964

3,119,361
YARN FEED APPARATUS WITH DETACHABLE TEMPLATE
Henry F. Nowicki, Norristown, Pa., assignor to James Lees and Sons Company, Bridgeport, Pa., a corporation of Delaware
Filed Apr. 24, 1961, Ser. No. 105,002
3 Claims. (Cl. 112—79)

This invention pertains to tufting of pile fabrics and more particularly to an improvement in machines for producing patterned or sculptured tufted floor coverings.

Carpet tufting machines may be described as those in which a series of needles oscillating vertically carry the pile yarns into and through a backing fabric which is fed across a throat plate underneath the needles. The pile yarns are delivered to the needles in a variety of ways but where it is desired to produce high and low pile in accordance with a pattern some differential feed or tensioning mechanism for individual pile yarns or groups of pile yarns is employed. A preferred form of such yarn control or feed mechanism is shown in United States Patents Nos. 2,853,032; '033; and '034 in which the pile yarns are carried to the needles by means of a series of pattern bars secured to chains or to the periphery of a drum. These pattern bars are suitably notched or contoured so that when a series of the bars intermeshes or interdigitates with a second flight of bars of uniform height the amount of yarn drawn through the intermeshing zone is proportional to the depth of intermeshing of the particular yarn controlling section of the patterned bars.

Pattern attachments of the Crawford type referred to above and disclosed in the Crawford Patents Nos. '033 and '034 have been found to be very satisfactory in providing differential feed to a broad tufting machine. Yarn control is more positive, better pattern definition is achieved, and accurate feeding of each individual yarn end is possible as compared to roller attachments which control only groups of yarns.

The pattern bars for the Crawford patent attachments are preferably made of angle iron or extruded aluminum sections. These items are expensive and it is time consuming to hand mill the various notches in the pattern bars to control the yarns. Pattern changes are also costly and time consuming. Furthermore, the range of pile height has been somewhat limited.

A primary object therefore of the present invention is to provide an improved pattern bar for the pattern attachment of a pile tufting machine.

A further object is to provide a series of quick detachable pile yarn pattern inserts for the pattern attachment of a pile fabric tufting machine.

A still further object is to provide a plurality of slotted bars for the pattern attachment of the tufting machine and a series of templates quickly attachable and detachable in said slots.

A still further object is to provide an improved yarn feed for differentially controlling the rate at which parallel yarns or threads are delivered to a textile machine.

Figure 2:
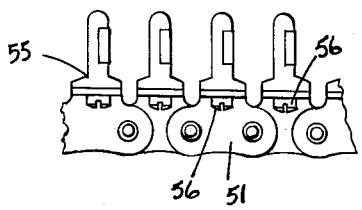
Figure 3:
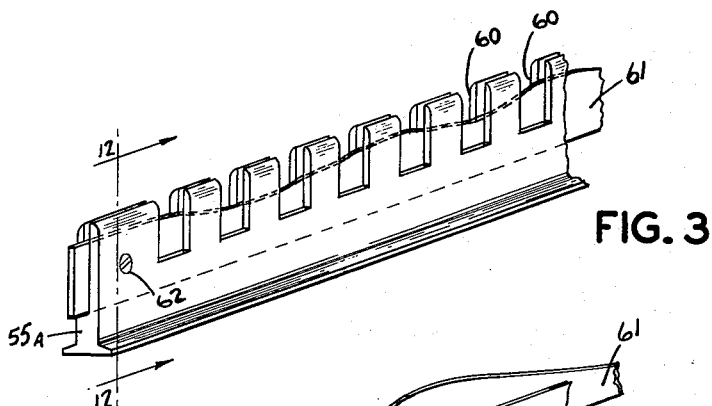
Figure 5:
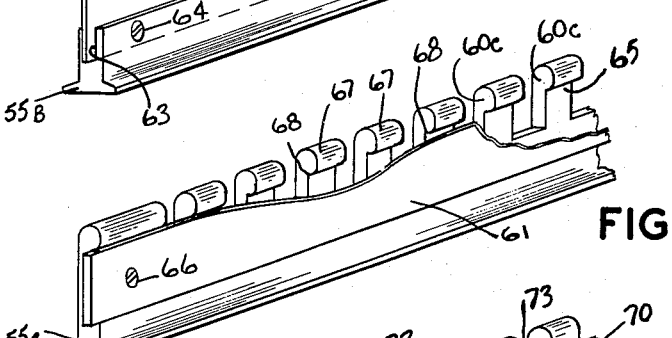
Figure 6:
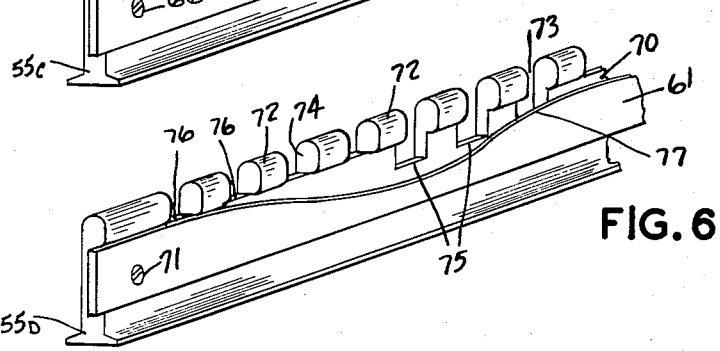
Figure 7:
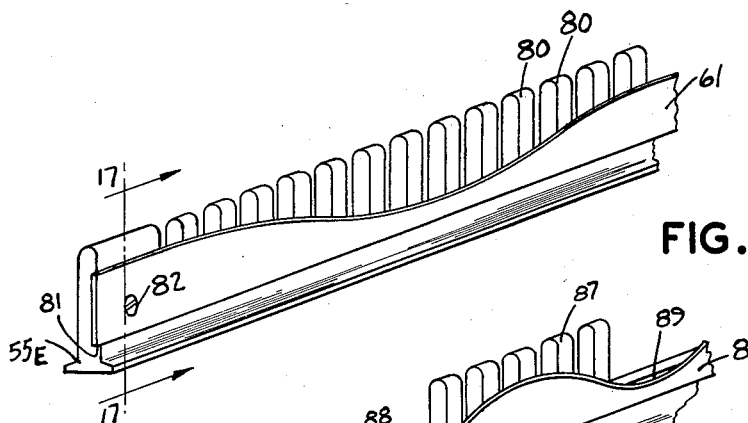
Figure 8:
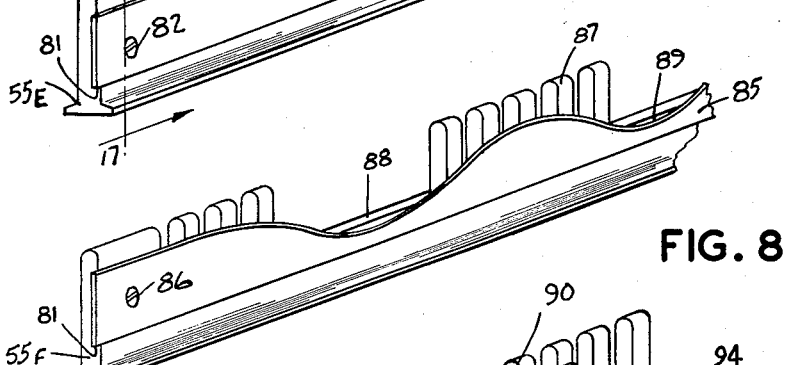
Figure 9:
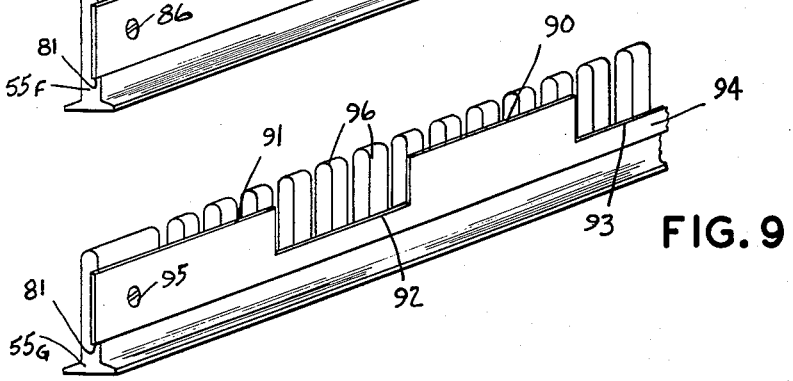
Figures 10, 11:
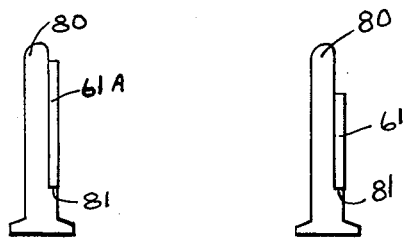
Figure 20:
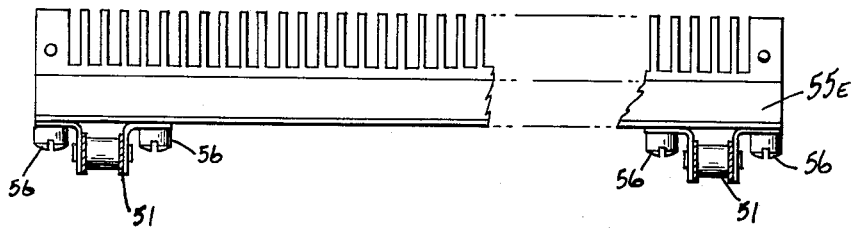
Figure 21:
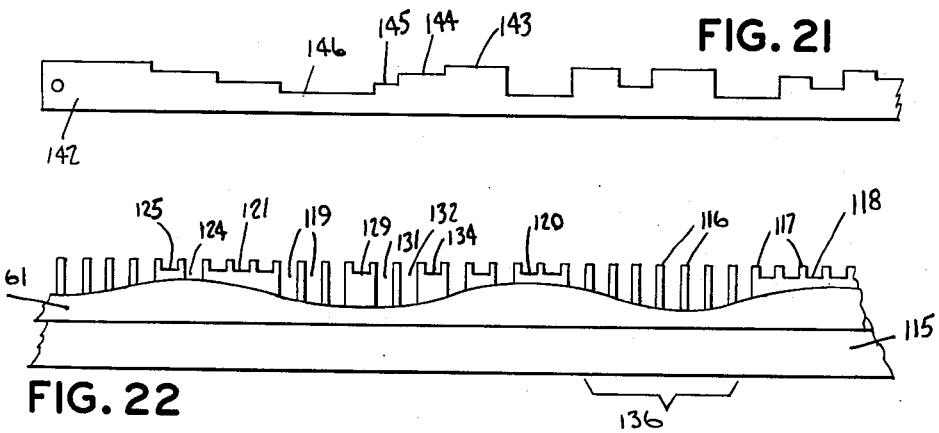
Figure 22:
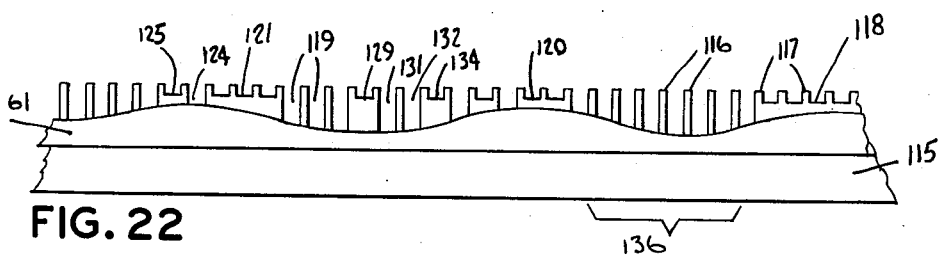
Figure 23:
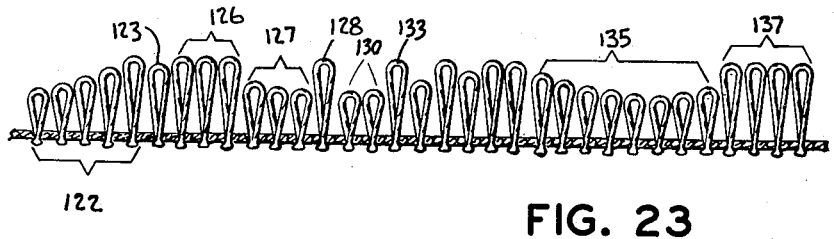
Figure 24:
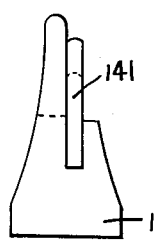

Further objects will be apparent from the specification and drawings in which:

FIGURE 1 is a schematic transverse sectional view of a pile fabric tufting machine constructed in accordance with the present invention, FIGURE 2 is an enlarged end view of a portion of the pattern chain shown in FIGURE 1, FIGURES 3–9 are fragmentary perspectives showing various forms of improved bars for the pattern attachment constructed in accordance with the present invention, FIGURES 10 and 11 are end views of representative bars constructed in accordance with the present invention showing templates of varied height, FIGURES 12–19 show various means for quickly securing the templates in the slotted or milled bars, FIGURE 12 being a section as seen at 12—12 of FIGURE 3, and FIGURE 17 being a section as seen at 17—17 of FIGURE 7, FIGURE 20 is a side view of a preferred pattern bar showing its manner of attachment to the pattern chain, FIGURE 21 is a side view of a portion of a stepped template for a pattern bar, FIGURE 22 is a fragmentary side view of a variation in the construction of a pattern bar and a template, FIGURE 23 is a fragmentary section of a pile fabric showing the pile heights that are produced with the pattern bar and template of FIGURE 22, and FIGURE 24 is an end view of a modified shape of pattern bar.

Referring now more particularly to the drawings, a pile fabric tufting machine of the type to which the present invention is suited comprises a bed 25 having a throat 26 over which a backing fabric F is fed from a pin feed roll 27 to a pin take-up roll 28. A series of loopers 29 is mounted on a looper rockshaft 30 and oscillate back and forth to assist in forming pile projections as the needles 35 are penetrated through the fabric F.

The pile yarn P is fed to needles 35 from a creel, not shown, by means of a pattern attachment PA which will be described more fully hereinafter. Pile yarn P passes through stationary yarn guide 36 and oscillating yarn guide 37 which in turn is attached to the needle bar 38 in which the needles 35 are mounted.

A presser foot 40 is carried on the upper guides 41 for the needle bar and a crankshaft 42 in housing 43 rotates to oscillate the needle bar 38 up and down by reason of the eccentric 44 which is connected to the needle bar through a crank 45 and rod 46.

The pile yarns P are carried through two substantially parallel flights of the pattern chains 50 and 51. The lower pattern chain 50 consists of a series of pattern bars 52, 52 secured to chain 50 and passing around a sprocket 53. The upper or yarn controlling flight of chain 50 is directed over a substantially horizontal surface 54 where the pattern bars 55 of chain 51 intermesh with the bars 52. Chain 51 is carried around sprockets 56 and 57, the latter one of which is supported on a standard 58. Suitable intermeshing drive between chains 50 and 51 as well as a power source are provided as generally described in the Crawford patents above. It will be understood in accordance with the teaching of the Crawford patents that the amount of pile yarn P which is fed or drawn from the yarn supply such as the creel depends upon the depth of intermeshing between individual yarn control areas of the bars 52 and 55 in the intermeshing zone between surfaces 54 and 54a. In order to provide improved yarn control and to facilitate the changing of patterns, I utilize a series of pattern bars 55 which are permanently secured to the chain 51 as seen in FIGURES 2 and 20. These bars may take a variety of shapes and sizes to be described hereinafter but they are all characterized by the ability to remain permanently secured to the chain links by means of rivets or screws 56, 56. The pattern bar 55a, shown in FIGURE 3, is provided with a plurality of transverse notches 60, 60 which engage the pile yarns P and prevent lateral displacement thereof in the intermeshing zone between plates 54 and 54a. In the showing of FIGURE 3, the notches 60 may be wide enough to separate groups of pile yarns so that the same or substantially the same displacement is imparted to more than one pile yarn at the same time. The pattern bar 55A is also longitudinally slotted to receive the template 61 which is retained in the pattern bar by any convenient means such as a screw 62. Template 61 may be of any configuration such as the undulating shape shown in FIGURE 3 or it may be of a stepped variety of the type shown in FIGURE 21. The template may be steel, synthetic plastic, wood, paperboard, or any other material capable of quick and accurate fabrication.

Figure 4:
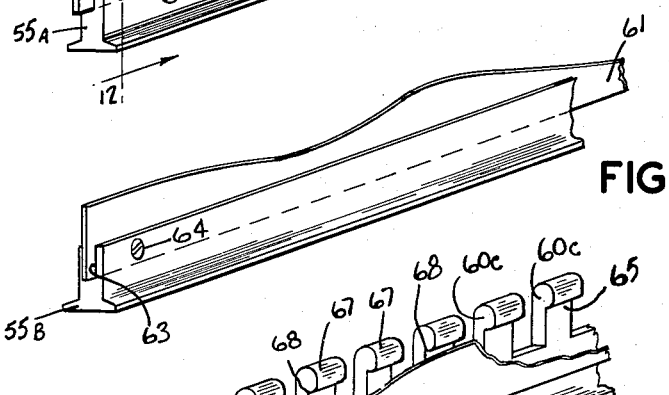

The pattern bar 55B, shown in FIGURE 4, somewhat resembles the bar 55A but in this case the transverse slots 60 are eliminated with the undulating template 61 retained in a shallow transverse groove 63 by means of a screw such as 64 at each end. For certain conditions and certain types of yarn where lateral control or stability is not critical, it may be feasible to eliminate the comb or toothlike control provided by the slots 60, 60.

The pattern bar 55C of FIGURE 5 has the transverse slots 60c, 60c but instead of having a central milled groove as is shown in FIGURE 3, a lateral groove 65 is provided along one side of the upright portion of the bar. The same template 61 may be employed in this version and it in turn is held in the bar 55C by means of a screw 66. Preferably the edges of the teeth 67, 67 are somewhat rounded and smoothed at 68 to prevent snagging of the pile yarns.

The pattern bar 55D, shown in FIGURE 6, likewise uses a side milled face or groove 70 to receive the template 61 and retain it in the bar by means of the screw 71 or other similar fastener. In this form, however, the teeth 72, 72 are not cut completely to the base so that a series of transverse slots 73 and 74 are provided having various depths. Two low slots are shown at 75, 75 and two high slots are shown at 76. This form of pattern bar provides a superimposed effect in which a basic high and low design provided by the depth or bottoms 75 and 76 of some of the grooves can be modified by positioning the template 61 in front of certain slots to mask them out as shown clearly at 77.

Pattern bar 55E, shown in FIGURE 7, is in general similar to the pattern bar 55C of FIGURE 5 but in this form the teeth 80, 80 have perfectly straight sides as will be seen in FIGURE 17. The template 61 in this case is seated on a shoulder 81 and retained in position by means of the fastening device which may be in the form of a flat head screw 82 or the round head screw 107 shown in FIGURE 17. With the pattern bar of the 55C type, pile height may be varied by using templates that are relatively taller or shorter. This is shown in FIGURES 10 and 11 in which the template 61A is substantially taller than template 61. Here again the reduced cost, time and ease of changing pile heights in the same pattern fabric is clearly demonstrated since it is only necessary to remove and re-install deeper or shallower templates to produce the desired pile height in order to supply a particular contract order or to develop a fabric variation.

The pattern bar 55F of FIGURE 8 has a template 85 also undulating but of somewhat greater frequency and secured to the side of the pattern bar by the fastening means 86. Here, however, the form of the pattern bar has been somewhat altered by removing a series of the teeth 87 so that voids at 88 and 89 are provided. In effect, the pattern bar of FIGURE 8 repersents a compromise between the bar 55B and the bar 55C.

Bar 55G of FIGURE 9 illustrates the use of a different style of template in which the yarn controlling upper edge is stepped to form high yarn edges 90, 91 and lower yarn control edges 92, 93. This template 94 is secured to the pattern bar at 95 and the pattern bar in this case is provided with a full complement of teeth 96. It will be understood that one or more of these teeth 96 may be omitted.

FIGURES 12-19 illustrate various fastening means for the templates indicated generally by the numeral 61 shown in various forms of pattern bars. In FIGURE 12 the template 61 is secured in place by means of flat head machine screws for example 62. In FIGURE 13 the template is secured in place with a cotter pin 98. In FIGURE 14 a dowel pin 99 is carried on a plate 100 which is in turn controlled by means of a spring loaded button 101 movable to disengage the dowel 99 from the hole in the end of the template. In FIGURE 15 a spring loaded ball detent 102 retains the template in place by means of a flat spring 103 riveted to the pattern bar at 104. In FIGURE 16 a clip type retainer 105 is mounted in the pattern bar 55A in a slot or hole 106. The retainers 105 securely anchor the template in the pattern bar at each end. A round head machine screw 107 is shown holding the template 61 to the side of the pattern bar 55E in FIGURE 17. The side mounting of the template 61 is shown in FIGURE 18 with a flat spring 108 riveted to the pattern bar 55E at 109. In FIGURE 19 a ball detent 110 is spring loaded by a leaf spring 111 secured to the comb by means of a rivet 112 and backed up by plate 113.

Referring now to FIGURES 20-24, the precise method of controlling a series of pile yarns will be more fully explained. The pattern bar 55E which is at all times mounted on the chains 51, 51 by means of the screws 56 may be modified to provide a combined or superimposed high and low effect. In this case the pattern bar 115 is provided with a comb having a plurality of teeth 116, 116 for guiding and controlling the individual pile yarns. Certain of the teeth such as 117, 117 separate individual yarn ends into shallow grooves 118, 118 between these teeth to produce higher pile due to the fact that more yarn is pulled from the creel during the interdigitating of the pattern bars in the meshing zone. The deeper notches 119 permit the pile yarns to extend substatnially to the bottom of the notches which would normally produce lower pile or shorter loops. However, the superposition of the template 61 can be utilized to modify the effect of the deeper notches 119. Thus, the template 61 masks some of the low or lower areas intermediate the high areas 120 and 121 and thereby an undulating or wavy effect is achieved.

The relative height of the loops produced with the bar of FIGURE 22 may be seen in FIGURE 23. Here in the areas 122 it will be seen there is a gradual increase in loop height from left to right which corresponds with the increase provided by the lefthand portion of the undulating template 61. The next pile loop 123 is controlled by the template in notch 124 which is lower than the base of the previous notch 125 formed in the bar 115. The next three loops from left to right bracketed at 126 are controlled by the bar section 121 to provide constant height pile projections. Pile height control is then transferred to the template for loops 127 with a single high projection 128 formed by notch 129 in the bar 115. The next two loops bracketed at 130 are formed by the top edge of the template in notches 131 and 132. The single high loop 133 is effected by means of bar notch 134 and so forth over the remaining area of the bar and template. Particular attention, however, is directed to the quick change from an undulating series of loops bracketed at 135 formed by the corresponding area 136 of the template which can be instantly transferred to a series of high constant height loops bracketed at 137 by means of the notches 118 on the bar 115.

FIGURE 24 is an end view of a modified bar 140 in which the template 141 is substantially centered in the bar instead of being offset as shown in FIGURES 10 and 11. This form provides ample structural rigidity for the bars and would eliminate any tendency for the bars to tilt or twist on the chains 51, 51.

In place of the undulating template 61 it is possible to utilize a stepped template such as shown in FIGURE 21 in which the pile projections vary in height depending upon the depth of the various steps. Likewise the length of the steps can be varied as well. The template 142 in FIGURE 21 is shown having the highest step 143 dropping down to three lower heights through steps 144, 145, and 146. It will also be apparent that there is an extremely wide variety of design effects possible with respect to the pile height and most important of all these heights can be readily provided and changed without the necessity for detaching any of the bars from the chains.

It will thus be understood that the present invention provides vastly improved means for effectively controlling the individual pile height or more broadly the feed of yarns to a textile machine. The device has been described primarily in conjunction with a pile fabric tufting machine but it is also useful in conjunction with knitting machines and looms for weaving other forms of pile fabrics. The ability to provide abrupt or gradual height gradations with quickly effected template changes in the pattern bars represents a most important time and labor saving feature of the invention. The superimposed effects that can be achieved and the ability to provide minor variations in a basic pattern are also important added tools to the fabric designer.

Having thus described my invention, I claim:

1. In combination with a tufting machine, a pattern attachment for differentially feeding indeterminate lengths of thread, yarn, or the like, comprising a first series of spaced yarn feeding bars extending across the path of yarn feed, at least one endless chain means secured to said first series of feeding bars, a second series of spaced yarn feeding bars extending across the path of yarn feed, at least one endless chain means secured to said second series of spaced yarn feedings bars, at least one of said series of bars provided with a plurality of transverse notches, means for directing a moving flight of the first series of bars along a linear path, means for directing a moving flight of the second series of bars along a closely spaced parallel linear path, a zone between said linear paths in which yarn intermeshed between interdigitating bars in said zone is moved with the bars to draw yarn from a yarn supply, a yarn engaging template in which the top edge thereof is non-uniform in configuration so as to provide a contoured yarn engaging edge secured in detachable relationship to those bars having notches therein with said non-uniform edge intersecting at least certain of said notches, and means for quickly attaching and detaching the template to the bars having same without removing the chain from the directing means.

2. A tufting machine pattern attachment in accordance with claim 1 wherein the series of bars provided with a plurality of transverse notches are provided with a longitudinally extending slot and the detachable template is positioned within said longitudinally extending slot.

3. A tufting machine pattern attachment in accordance with claim 1, wherein the template is secured to an outside face of the feeding bars.

References Cited in the file of this patent

UNITED STATES PATENTS

| | | |
|---|---|---|
| 21,488 | Corey | Sept. 14, 1858 |
| 2,642,098 | Stoeckel | June 16, 1953 |
| 2,850,994 | Crawford | Sept. 9, 1958 |
| 2,853,032 | Odenweller | Sept. 23, 1958 |
| 2,853,033 | Crawford | Sept. 23, 1958 |